(12) United States Patent
Stracovsky et al.

(10) Patent No.: US 12,455,799 B2
(45) Date of Patent: Oct. 28, 2025

(54) EXPLICIT LOCKSTEP FOR FUNCTIONAL SAFETY

(71) Applicant: QUALCOMM Incorporated, San Diego, CA (US)

(72) Inventors: Henry Stracovsky, Austin, TX (US); Nir Maor, San Diego, CA (US); Antonio Priore, Cambridge (GB); Vikas Kumar Sinha, Austin, TX (US); Paul Kitchin, Austin, TX (US); Sunil Oak, Sugar Land, TX (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 18/494,565

(22) Filed: Oct. 25, 2023

(65) Prior Publication Data

US 2024/0419451 A1    Dec. 19, 2024

Related U.S. Application Data

(60) Provisional application No. 63/508,752, filed on Jun. 16, 2023.

(51) Int. Cl.
  *G06F 11/16* (2006.01)
  *G06F 9/38* (2018.01)

(52) U.S. Cl.
  CPC ........ *G06F 11/1629* (2013.01); *G06F 9/3861* (2013.01); *G06F 11/1641* (2013.01); *G06F 9/3851* (2013.01)

(58) Field of Classification Search
  CPC .... G06F 9/3861; G06F 9/3851; G06F 9/3888; G06F 9/3863; G06F 11/1629; G06F 11/1641
  See application file for complete search history.

(56) References Cited

U.S. PATENT DOCUMENTS

| 9,195,550 | B2* | 11/2015 | Tsafrir | G06F 9/3851 |
| 2013/0326289 | A1* | 12/2013 | Hastie | G06F 11/1641 714/54 |
| 2016/0004535 | A1* | 1/2016 | Robertson | G06F 9/30189 712/205 |

(Continued)

OTHER PUBLICATIONS

International Search Report and Written Opinion—PCT/US2024/027091—ISA/EPO—Sep. 16, 2024.

*Primary Examiner* — Courtney P Spann
(74) *Attorney, Agent, or Firm* — Seyfarth Shaw LLP

(57) ABSTRACT

A method of explicit lockstep for functional safety includes spawning, by a main thread, a first safe thread core and a second safe thread core. The method also includes initializing and mapping a first data register associated with the first safe thread core to each safe variable of a set of predetermined safe variables. The method further includes initializing and mapping a second data register associated with the second safe thread core to each safe variable of the set of predetermined safe variables. The method also includes comparing, by a hardware comparator, a first safe variable value in the first data register to a second safe variable value in the second register. The method further includes issuing an error completion to the first safe thread core and the second safe thread core when the hardware comparator detects a mismatch between the first data register and the second data register.

18 Claims, 11 Drawing Sheets

(56) References Cited

U.S. PATENT DOCUMENTS

| | | | |
|---|---|---|---|
| 2017/0351577 A1* | 12/2017 | Scobie | G06F 11/1641 |
| 2017/0357557 A1* | 12/2017 | Jain | G06F 11/1641 |
| 2018/0203778 A1* | 7/2018 | Bansal | G06F 11/1645 |
| 2019/0235448 A1* | 8/2019 | Banginwar | H04L 12/40 |
| 2019/0294125 A1* | 9/2019 | Deka | G05B 9/02 |
| 2020/0089559 A1 | 3/2020 | Ainsworth et al. | |
| 2020/0310683 A1* | 10/2020 | Costa | G06F 9/5016 |
| 2021/0303372 A1* | 9/2021 | Santoni | G06F 11/1629 |
| 2021/0373898 A1 | 12/2021 | Selwan | |

* cited by examiner

EXPLICIT LOCKSTEP FOR FUNCTIONAL SAFETY

CROSS-REFERENCE TO RELATED APPLICATION

The present application claims the benefit of U.S. Provisional Patent Application No. 63/508,752, filed Jun. 16, 2023, and titled "EXPLICIT LOCKSTEP FOR FUNCTIONAL SAFETY," the disclosure of which is expressly incorporated by reference herein it its entirety.

BACKGROUND

Field

Aspects of the present disclosure relate to semiconductor devices and, more particularly, to an explicit lockstep for functional safety (FuSa).

Background

Functional safety (FuSa) may be defined as the elimination or absence of unacceptable risk due to hazards caused by malfunctioning behavior of safety critical subsystems, such as electrical systems and/or electronic systems. That is, FuSa is directed to preventing systematic design failures and detecting and controlling random hardware faults. For example, an operation in a safety critical subsystem may be corrupted by permanent (e.g., hardware failure) or transient (e.g., typically particle induced) faults. The faults may lead to consequences that increase the risk of a hazard occurring (e.g., a loss of control or a crash).

Note that faults may not be detected, and in the permanent case may cause a stream of errors. For example, in the automotive sector, a competitor may claim superior diagnostic coverage (e.g., FuSa), in spite of undetected faults. Nevertheless, if the distance data from a sensor (e.g., light detection and radar (LIDAR)) subsystem is incorrect, crash mitigation braking might fail to apply on-time. One way of counteracting this is to implement dual (or more) core lockstep, which has an exceedingly high coverage. This implementation is exceedingly difficult for high performance processors and may not be available until a next automotive generation due to the extremely high design and verification effort specified. An alternate, simpler solution is desired for providing functional safety.

SUMMARY

A method of explicit lockstep for functional safety includes spawning, by a main thread, a first safe thread core and a second safe thread core. The method also includes initializing and mapping a first data register associated with the first safe thread core to each safe variable of a set of predetermined safe variables. The method further includes initializing and mapping a second data register associated with the second safe thread core to each safe variable of the set of predetermined safe variables. The method also includes comparing, by a hardware comparator, a first safe variable value in the first data register to a second safe variable value in the second register. The method further includes issuing an error completion to the first safe thread core and the second safe thread core when the hardware comparator detects a mismatch between the first data register and the second data register.

A non-transitory computer-readable medium having program code recorded thereon for explicit lockstep for functional safety is described. The program code is executed by a processor. The non-transitory computer-readable medium includes program code to spawn, by a main thread, a first safe thread core and a second safe thread core. The non-transitory computer-readable medium also includes program code to initialize and map a first data register associated with the first safe thread core to each safe variable of a set of predetermined safe variables. The non-transitory computer-readable medium further includes program code to initialize and map a second data register associated with the second safe thread core to each safe variable of the set of predetermined safe variables. The non-transitory computer-readable medium also includes program code to compare, by a hardware comparator, a first safe variable value in the first data register to a second safe variable value in the second register. The non-transitory computer-readable medium further includes program code to issue an error completion to the first safe thread core and the second safe thread core when the hardware comparator detects a mismatch between the first data register and the second data register.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
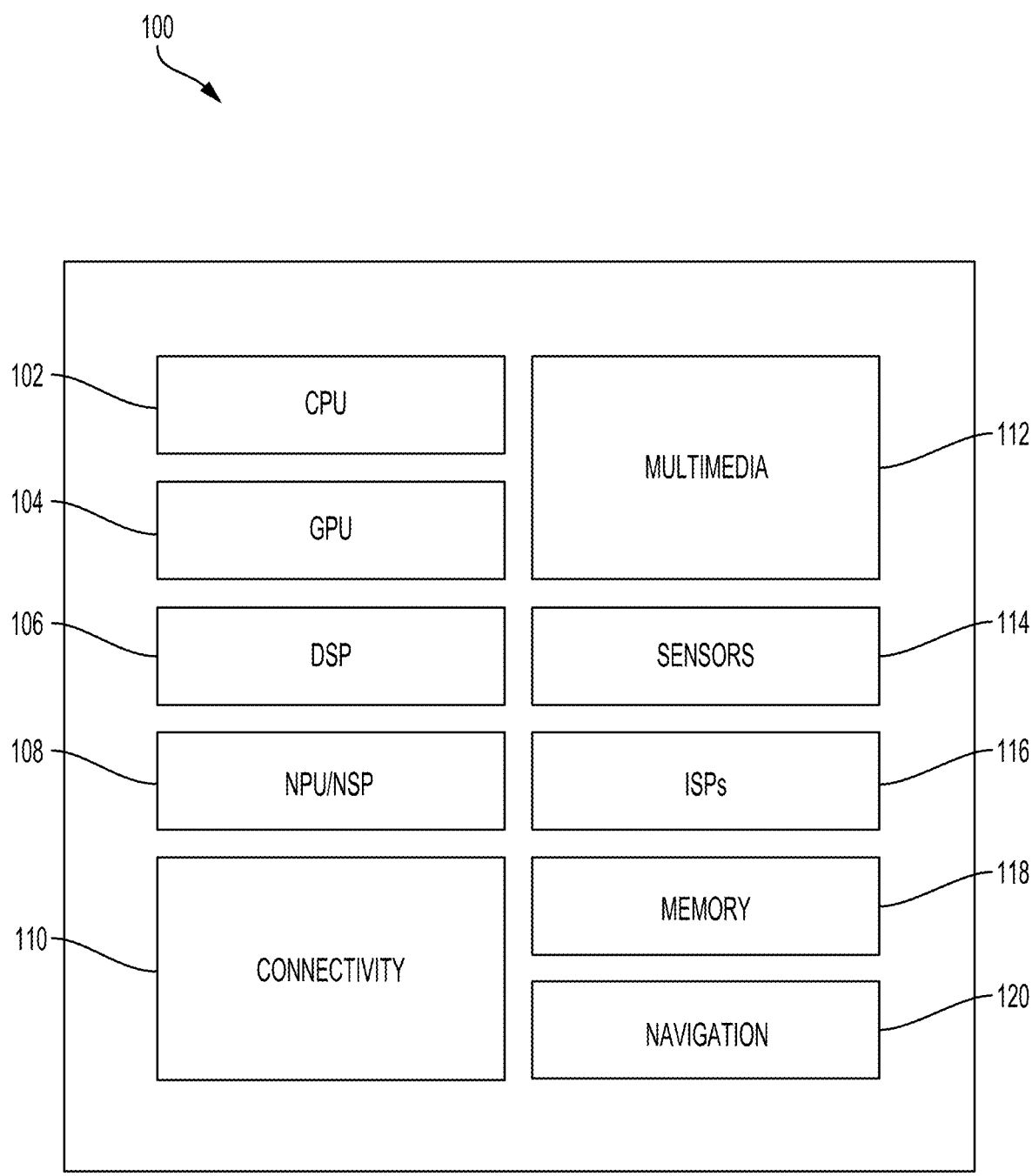
FIG. 1 illustrates an example implementation of a host system-on-chip (SoC), which is configured for an explicit lockstep operation to provide functional safety (FuSa), in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations. It will be understood that the term "layer" includes film and is not construed as indicating a vertical or horizontal thickness unless otherwise stated. As described, the term "substrate" may refer to a substrate of a diced wafer or may refer to a substrate of a wafer that is not diced. Similarly, the terms "chip" and "die" may be used interchangeably.

Functional safety (FuSa) may be defined as the elimination or absence of unacceptable risk due to hazards caused by malfunctioning behavior of safety critical subsystems, such as electrical systems and/or electronic systems. That is, FuSa is directed to preventing systematic design failures and detecting and controlling random hardware faults. For example, an operation in a safety critical subsystem may be corrupted by permanent (e.g., hardware failure) or transient (e.g., particle induced) faults. The faults may lead to consequences that increase the risk of loss of control or a crash.

Note that faults may not be detected and in the permanent case may cause a stream of errors. For example, in the automotive sector, a competitor may claim superior diagnostic coverage (e.g., FuSa). As an example: if the distance data from a sensor (e.g., light detection and radar (LIDAR)) subsystem is incorrect, crash mitigation braking might fail to apply on-time. One way of counteracting this is to implement dual (or more) core lockstep, which has a remarkably high coverage. This implementation is exceedingly difficult for high performance processors and may not be available until a next automotive generation due to the exceedingly high design and verification effort specified.

As an example, in a prior art system, an interpolator in an exponential function had a hard failure that was not detected. The exponential function was used in data encryption and could not be retrieved by any processor core other than the core with the exact same fault. (Given the size of the cluster and the dynamic nature of the scheduling, it can be assumed the data was permanently lost.) One source of potential faults is software/firmware updates that are a source of security exploits, wherein the upgrades execute differently than the expected code. An alternative for providing a simple solution to functional safety is desired.

In practice, software test libraries (STLs) are used to detect permanent faults that have no other safety coverage. In some cases, it is difficult to cover the entire space of a logical block. As a result, the effectiveness of STLs is inversely proportional to a runtime of the STLs, and because STLs are run instead of a 'real' workload, STLs diminish the resources available to the customer.

Other existing solutions for providing functional safety implement a full dual core lockstep, in which two separate processors perform the same task and are tied together by comparators situated at various points, such as the write data bus. In these solutions, a missed compare detected by one of the comparators indicates an error in one of the processors; however, the specific processor that incurred the error is unknown. In practice, this solution is often staggered by one or more clock cycles to ensure that a clocking or electrical noise failure does not impact both processors in the same manner. For example, during operation of a microcontroller, an address/command bus, a data out bus, and/or control signals are compared with dummy pipeline stages to correct for clock offset.

Various aspects of the present disclosure are directed to an explicit lockstep for functional safety (FuSa), in which individual results are compared rather than all processor activities. According to various aspects of the present disclosure, an explicit lockstep architecture involves two processors to calculate results. In various aspects of the present disclosure, an end user selects safe variables as part of a software safety analysis for verification using the comparator hardware, in which a safe variable is assigned a physical memory location using a configuration status register (CSR) bus, an address bus, and a data bus. In these aspects of the present disclosure, the explicit lockstep architecture provides hardware comparison and synchronization support for specific addresses associated with the safe variables. Additionally, processor cores operate asynchronously up to a synchronization point, such that synchronization does not occur at all safe variables.

In various aspects of the present disclosure, explicit lockstep operation enables a simplified verification effort, in which any two processor cores in a cluster are paired with comparator hardware to perform the explicit lockstep operation. This processor core pairing is lightweight and, therefore, enables rapid reallocation of resources. In various aspects of the present disclosure, the comparator hardware may be implemented at a cluster level and also between clusters, for example, at a level-three (L3)/system cache level. Alternatively, the comparator hardware may be implemented in any hierarchy in which multiple processors have direct address space access or there is implicit data coherency. Additionally, the explicit lockstep operation provides a lighter recovery path because detected errors are contained at the comparator hardware, and the explicit lockstep operation is simple to expand to triple or higher-level redundancy, which provides more coverage as well as allowing nonstop operation via majority voting.

FIG. 1 illustrates an example implementation of a host system-on-chip (SoC) 100, which is configured for explicit lockstep operation to provide functional safety (FuSa), in accordance with aspects of the present disclosure. The host SoC 100 includes processing blocks tailored to specific functions, such as a connectivity block 110. The connectivity block 110 may include sixth generation (6G) connectivity, fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU)/neural signal processor (NSP) 108. The host SoC 100 may also include a sensor processor 114, image signal processors (ISPs) 116, a navigation module 120, which may include a global positioning system, and a memory 118. The multi-core CPU 102, the GPU 104, the DSP 106, the NPU/NSP 108, and the multimedia engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU/NSP 108 may be based on an ARM instruction set.

Traditional lockstep is expensive in terms of design and verification efforts, especially in large out of order speculative processors. Existing solutions implement a full dual core lockstep where two separate processors perform the same task and are tied together by comparators situated at various points, such as the write data bus. In this configuration, a missed comparison indicates an error in one of the processors. This solution is often staggered by one or more clock cycles to ensure that a clocking or electrical noise failure does not impact both processors in the same way. For example, in a microcontroller implementation, an address/command bus, a data out bus, and/or control signals are all compared with dummy pipeline stages to correct for clock offset.

Unfortunately, although this comparison enables detection of an error, the processor in which the error occurred is unknown. Consequently, error recovery from traditional dual core lockstep is expensive. In particular, because the error source is unknown, both cores are brought to a safe state. Additionally, error recovery may involve a core or system level reset because error containment may not be guaranteed. Furthermore, permanent errors destroy lockstep functionality. In practice, traditional lockstep is assigned to a specific set of cores tied together by comparators. Because the comparators operate on all sets of output signals and duplicate/synchronize all sets of input signals, lockstep cores are designated at implementation (although they may not run-in lockstep if the customer chooses).

Figure 2:
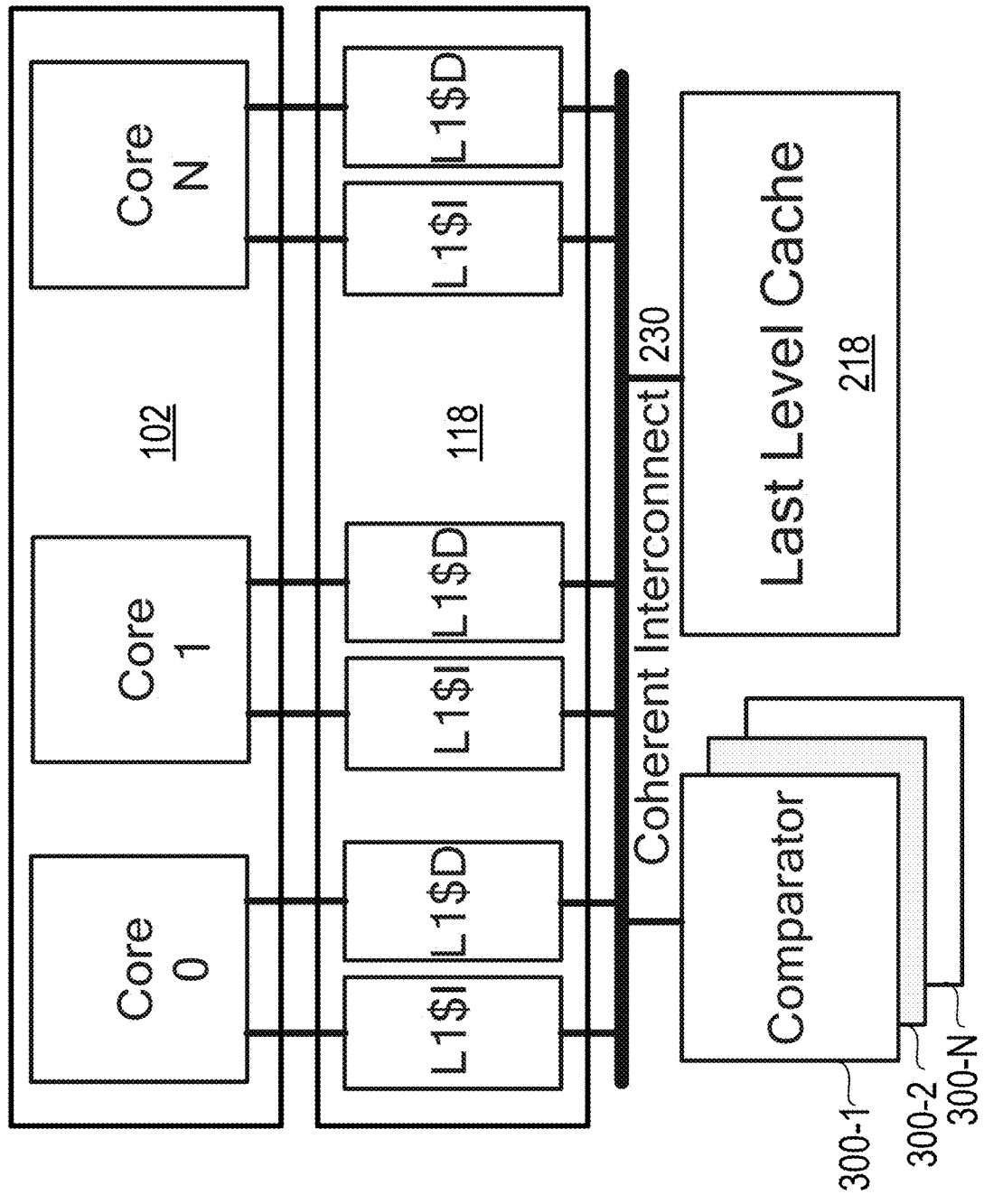
FIG. 2 is a circuit diagram further illustrating the system-on-chip (SoC) of FIG. 1, including a comparator to provide explicit lockstep operation, according to various aspects of the present disclosure.

FIG. 2 is a circuit diagram further illustrating the system-on-chip (SoC) of FIG. 1, including one or more comparators to provide explicit lockstep operation, according to various aspects of the present disclosure. As shown in FIG. 2, an SoC 200 is configured with hardware-based explicit lockstep, in which lockstep operation checks explicit results by providing comparator hardware 300 (300-1, 300-2, . . . , 300-N) per each specified safe variable. In this example, the comparator hardware 300 compares results of the individual safe variables, which are written by two separate ones of processor cores (core 0, core 1, . . . , core N). In various aspects of the present disclosure, a discrete implementation is possible using a small number of instances (e.g., 16-64 per hardware collector), or a memory-based implementation for a large number of instances. In operation, each instance of the comparator hardware 300 provides a comparison between data at two memory locations (e.g., variables) in the memory 118 (e.g., a level-one (L1) cache of instructions ($I) and data ($D)) and/or a last level cache (LLC) 218, accessed through a coherent interconnect 230. In various aspects of the present disclosure, an end user selects safe variables as part of a software safety analysis for verification using the comparator hardware 300, for example, as further illustrated in FIG. 3.

Figure 3:
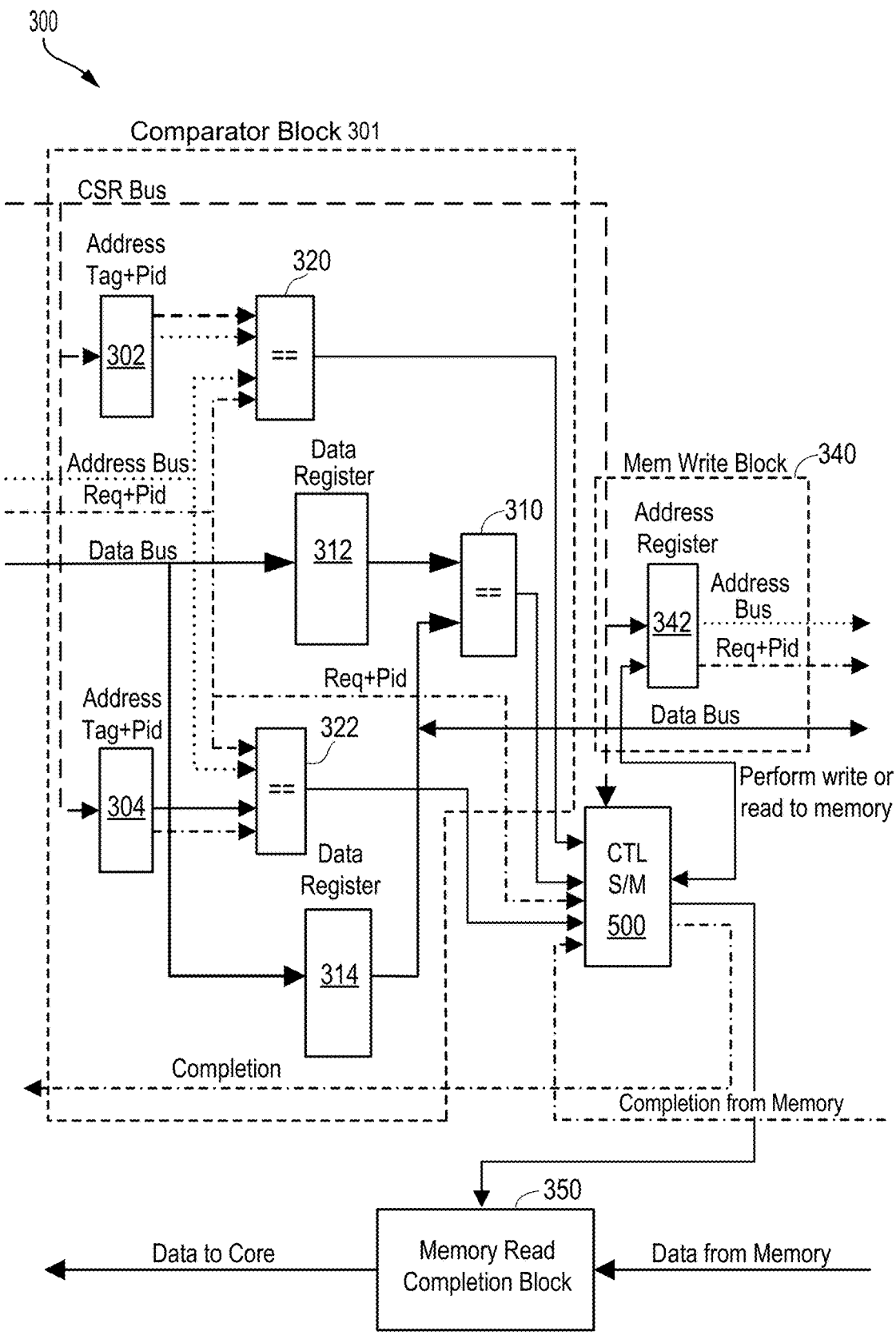
FIG. 3 is a schematic diagram further illustrating the comparator hardware of FIG. 2, according to various aspects of the present disclosure.

FIG. 3 is a schematic diagram further illustrating the comparator hardware 300 of FIG. 2, according to various aspects of the present disclosure. As shown in FIG. 3, the comparator hardware 300 includes a comparator block 301, in which a safe variable is assigned a physical memory location using a configuration status register (CSR) bus, an address bus, and a data bus. In this example, a physical memory page (e.g., by using a request (Req) and a page identification (PID) (Req+PID)) is allocated and mapped to an address space, and the safe variable is mapped to an offset in the allocated, physical memory pages. For example, a first physical memory page and a first address space may be assigned to one of the processor cores, and a second physical memory page and a second address space may be assigned to another of the processor cores.

In various aspects of the present disclosure, an initialization routine maps an address space (e.g., Address Tag) and PID to each safe variable for both of the processor cores (e.g., core 0, core 1, . . . , core N) involved in the explicit lockstep sequence. During operation, a first processor core 0 may write to a first memory address based on a first address bus, a first request (Req), and a first page identification (PID) (first Req+PID). In response, a first address comparator block 320 determines whether the first Req+PID from the first processor core (e.g., core 0) matches a mapped address (e.g., first Address Tag+PID 302) associated with a safe variable, and the data is stored in a first data register 312. A second processor core 1 may then write to a second memory address based on a second address bus, a second request (Req), and a second page identification (PID) (second Req+PID). In response, a second address comparator block 322 determines whether the second Req+PID from the second processor core (e.g., core 1) matches a mapped address (e.g., second Address Tag+PID 304) associated with the safe variable, and the data is stored in a second data register 314. Although described with reference to physical memory pages, various aspects of the present disclosure are applicable to non-virtual machine implementation.

According to this explicit lockstep sequence determined by an explicit lockstep sequence state machine (CTL S/M) 500 (see FIG. 5), when the first processor core 0 writes to the safe variable, the data is stored in the first data register 312. Until the second processor core 1 completes the write to that safe variable in the second data register 314, the first processor core 0 is not allowed to continue. Once the second processor core 1 completes the write, a safe variable value in a first data register 312 and a safe variable value in a second data register 314 are compared at a comparator block 310 and if the data is identical, both cores are provided with a completion. The data is then written through to memory (or a final destination) using a memory write block 340 based on an address in an address register 342. In some aspects of the present disclosure, the first data register 312 and second data register 314 may store a variable that is a memory mapped location. By contrast, if the data does not match, both cores are given an error completion, so a precise interrupt is taken. In this example, the data associated with the safe variable is not written to a next level of the memory 118, as shown in FIG. 2.

In some aspects of the present disclosure, during the time between the first write and the second write, all reads from the memory to both cores are stalled until the completion of the caparison at the comparator block 310. When the comparison at the comparator block 310 detects a match, a memory read completion block 350 allows the read to proceed. Otherwise, the memory read completion block 350 blocks the read in response to an error completion, allowing a precise exception to occur. For example, a precise exception provides a way of dealing with containment of the mismatched safe variable. Alternatively, other implementations may continue to block the read and issue an interrupt, for example.

Figure 4:
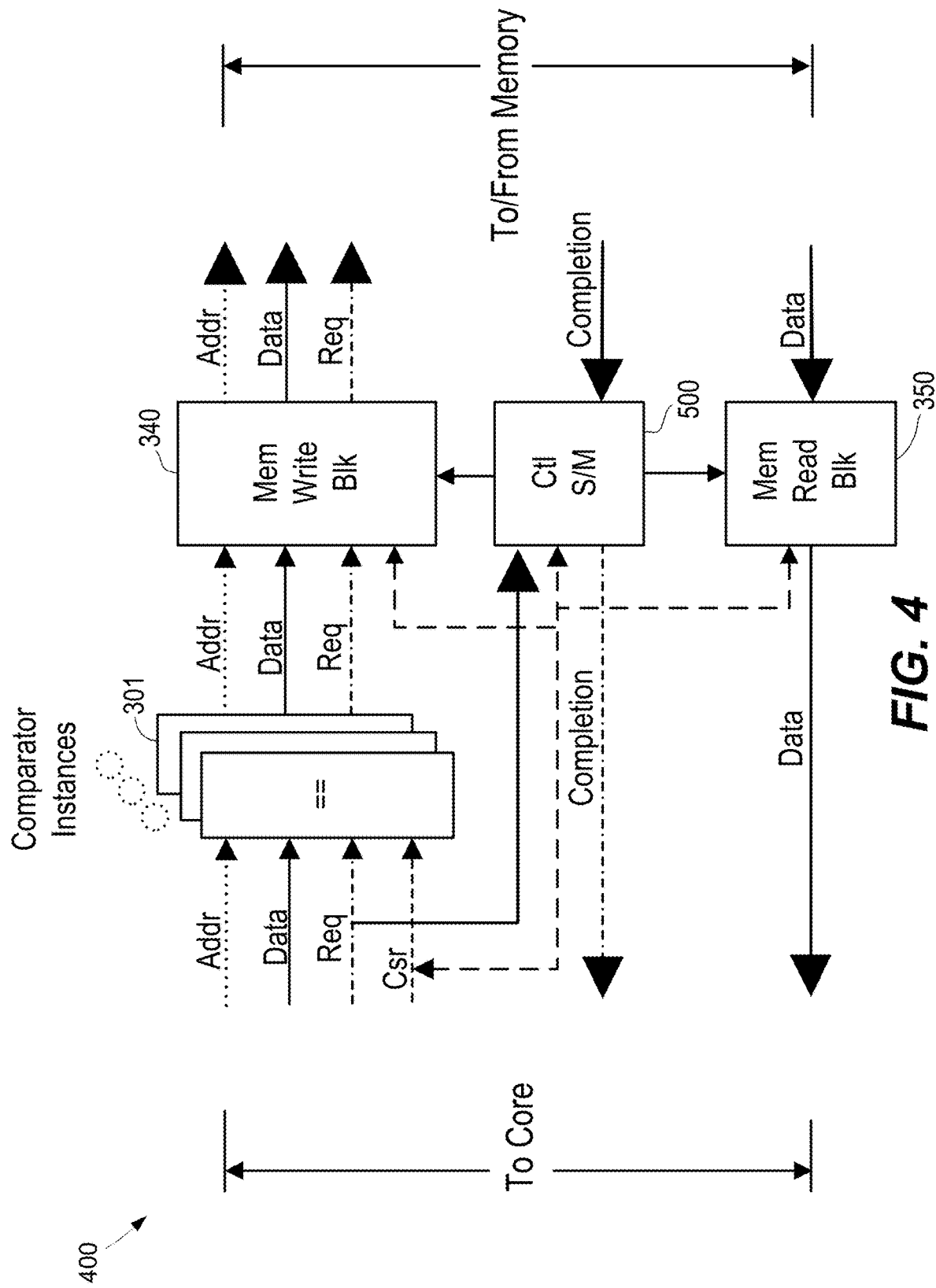
FIG. 4 is a schematic diagram illustrating multiple instances of the comparator block of FIG. 3, according to various aspects of the present disclosure.

FIG. 4 is a schematic diagram illustrating multiple instances of the comparator block 301 of FIG. 3, according to various aspects of the present disclosure. As shown in FIG. 4, multiple instances of the comparator block 301 are shown, in which a read stall is performed by each instance of the comparator block 301. In this example, a read cycle is performed from a block serving each instance of the comparator block 301. In some aspects of the present disclosure, a non-write blocking variation of a hardware comparator 400 is possible. In this non-write blocking variation, a thread is not blocked on writes and continues until the thread reaches a synchronization variable, which is defined as a variable that does block on a write.

In this non-write blocking variation of the hardware comparator 400, reads still stall on variables that have not been compared. Consequently, corrupt data is explicitly prohibited from propagating outside the hardware comparator 400 because reads from the corrupt data are prohibited. In operation, the defined safe variables are mapped into a first device space for blocking write access. Nevertheless, hardware may return a positive completion for a non-blocking variable. Additionally, defined safe variables are mapped into a second device space for non-blocking write access. This implementation involves a separate page for blocking access if hardware does not support positive completion for non-blocking safe variables in the first address space. In various aspects of the present disclosure, a watchdog breaks any hangs/rogue execution on the part of one of the processor cores. One potential implementation of the hardware comparator 400 is configured for triple redundancy as a potential future extension.

Figure 5:
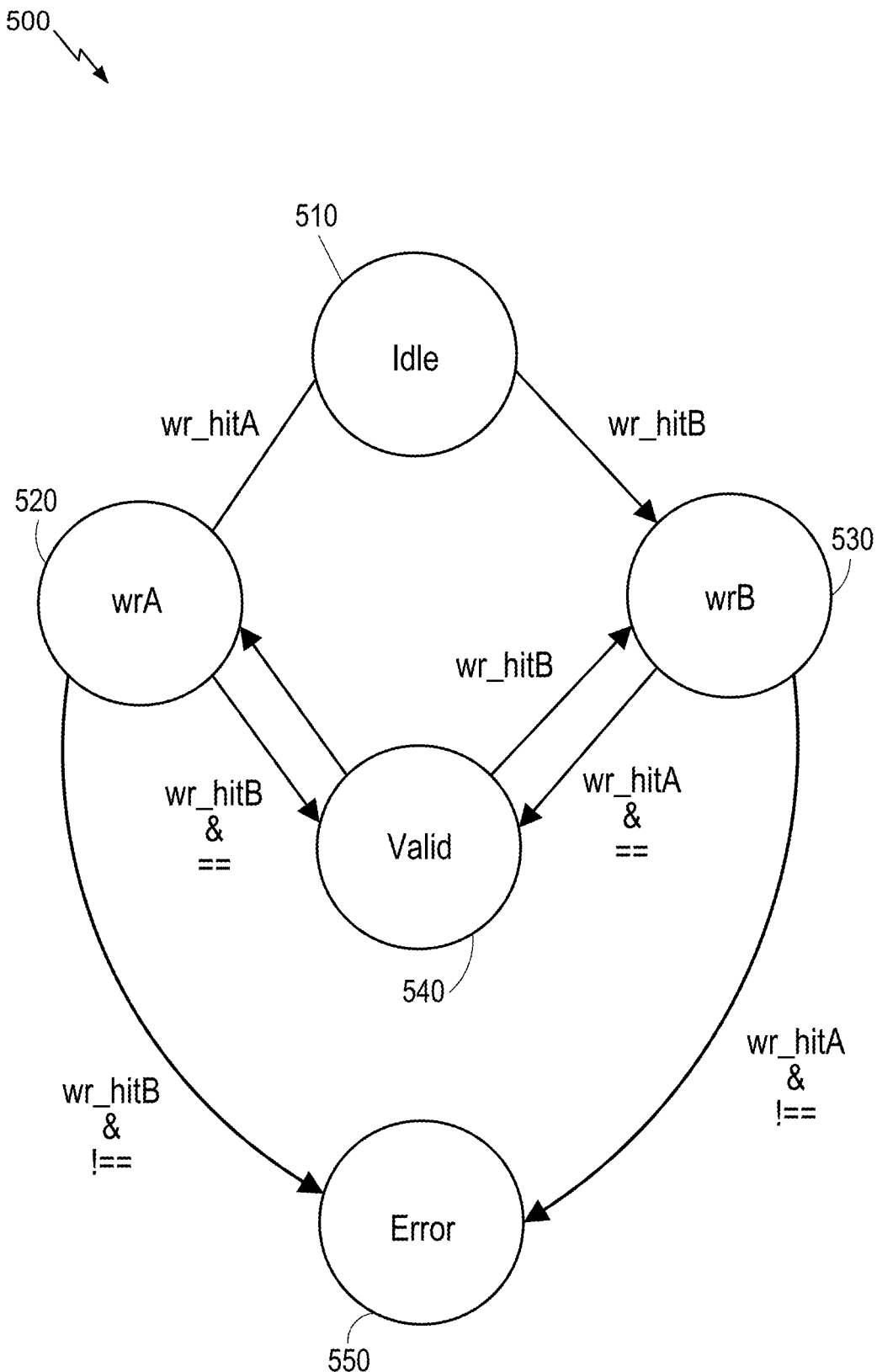
FIG. 5 is a state diagram illustrating explicit lockstep operation to provide functional safety (FuSa), according to various aspects of the present disclosure.

FIG. 5 is a state diagram illustrating explicit lockstep operation to provide functional safety (FuSa), according to various aspects of the present disclosure. In various aspects of the present disclosure, an explicit lockstep sequence state machine 500 may be configured to control operation of the comparator hardware 300, as shown in FIG. 3. In particular, the explicit lockstep sequence state machine 500 controls both the memory write block 340 and the memory read completion block 350 in response to the comparator block 310. In various aspects of the present disclosure, operation of the explicit lockstep sequence state machine 500 is described in Table I and Table II, based on an idle state 510, a matched write from a first processor core A (wrA state 520), a matched write from a second processor core B (wrB state 530), a valid state 540, and an error state 550.

As shown in Table I, the explicit lockstep sequence state machine 500 is enabled by firmware to initially enter the idle state 510. When a write from the core A is detected, the explicit lockstep sequence state machine 500 transitions from the idle state 510 to the wrA state 520. Otherwise, when a write from the core B is detected, the explicit lockstep sequence state machine 500 transitions from the idle state 510 to the wrB state 530. From the wrA state 520, the explicit lockstep sequence state machine 500 transitions to the valid state 540 if the write data from the core B matched the write data from the core A. Otherwise, if the write data from the core B does not match the write data from the core A, the explicit lockstep sequence state machine 500 transitions to the error state 550. Similarly, from the wrB state 530, the explicit lockstep sequence state machine 500 transitions to the valid state 540 if the write data from the core A matched the write data from the core B. Otherwise, if the write data from the core A does not match the write data from the core B, the explicit lockstep sequence state machine 500 transitions to the error state 550. Additionally, blocking, and non-blocking writes may be determined according to Table II.

TABLE I

| | State Description | | | |
|---|---|---|---|---|
| State | Description | Write from A | Write from B | Any Read |
| Idle | State machine enabled by firmware | Move to wrA | Move to wrB | Allowed but data not initialized |
| wrA | Match occurred on a write from source A | Usage error; block write | Move to Valid or Error | Stalled |
| wrB | Match occurred on a write from source B | Move to Valid or Error | Usage error; block write | Stalled |
| Valid | Data from source A and B matched | Move to wrA | Move to wrB | Allowed; data is correct |

TABLE I-continued

State Description

| State | Description | Write from A | Write from B | Any Read |
|---|---|---|---|---|
| Error | Data from source A and B match error, firmware required to exit | Return write with error and generate interrupt | Return write with error and generate interrupt | Return read with error completion code |

TABLE II

Blocking and Non-Blocking Writes

| State | Blocking | Non-Blocking |
|---|---|---|
| wrA | Stall source A | Give source A 'OK' completion |
| wrB | Stall source B | Give source B 'OK' completion |
| Valid | Give sources A and B OK completion | N/A |
| Error | Give sources A and B error completion | Give last write source error completion |

Figure 6:
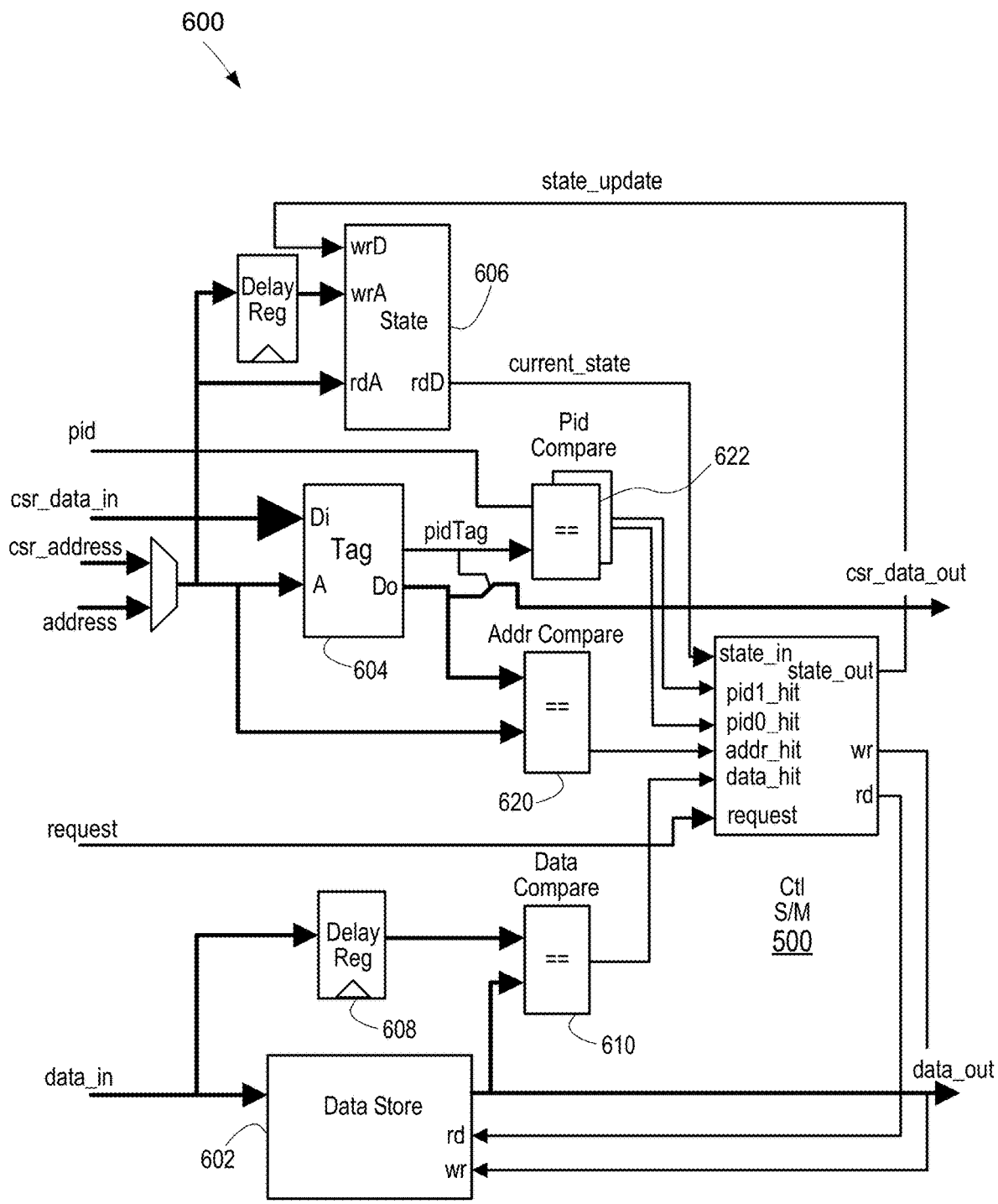
FIG. 6 is a schematic diagram further illustrating a memory array implementation of the comparator hardware of FIG. 2, according to various aspects of the present disclosure.

FIG. 6 is a schematic diagram further illustrating a memory array implementation of the comparator hardware of FIG. 2, according to various aspects of the present disclosure. In this example, multiple safe variables utilize a tagged memory structure. For example, FIG. 6 illustrates an alternative implementation of a comparator hardware 600, in which a memory array stores tags (e.g., tag 604) and state (e.g., state 606) information for comparators (e.g., PID compare 622, addr compare 620, and data compare 610). Additionally, the memory array stores data (e.g., 64-bit words, 4096 elements (variables)) in a data store 602, for example, as shown in Table III. Additionally, bytes, 16-bit words, and 32-bit words may be supported with masking at the tag 604 in some implementations.

TABLE III

| Array | Words | Bits/Word | Bytes | Total Bits |
|---|---|---|---|---|
| Data | 4096 | 64 | 32768 | 262144 |
| Tag | 4096 | 56 | 28672 | 229376 |
| State | 4096 | 8 | 4096 | 32768 |
| Total | | | 65536 | 524288 |

According to this explicit lockstep sequence determined by the explicit lockstep sequence state machine 500, when a second processor core 1 writes to a safe variable, the write data is stored in a delay register 608. For example, once the second processor core 1 completes the write, a safe variable value in the data store 602 and the write data stored in the delay register 608 are compared at the data compare 610 and if the data is identical, the request (e.g., a read or a write) is performed from the data store 602. The data is then written through to memory (or a final destination) using a data output (data_out). By contrast, if the data does not match, both cores are given an error completion, so a precise interrupt is taken. In this example, the data associated with the safe variable is not written to a next level of the memory 118, as shown in FIG. 2. A similar process may be performed by a first processor core 0.

Figure 7:
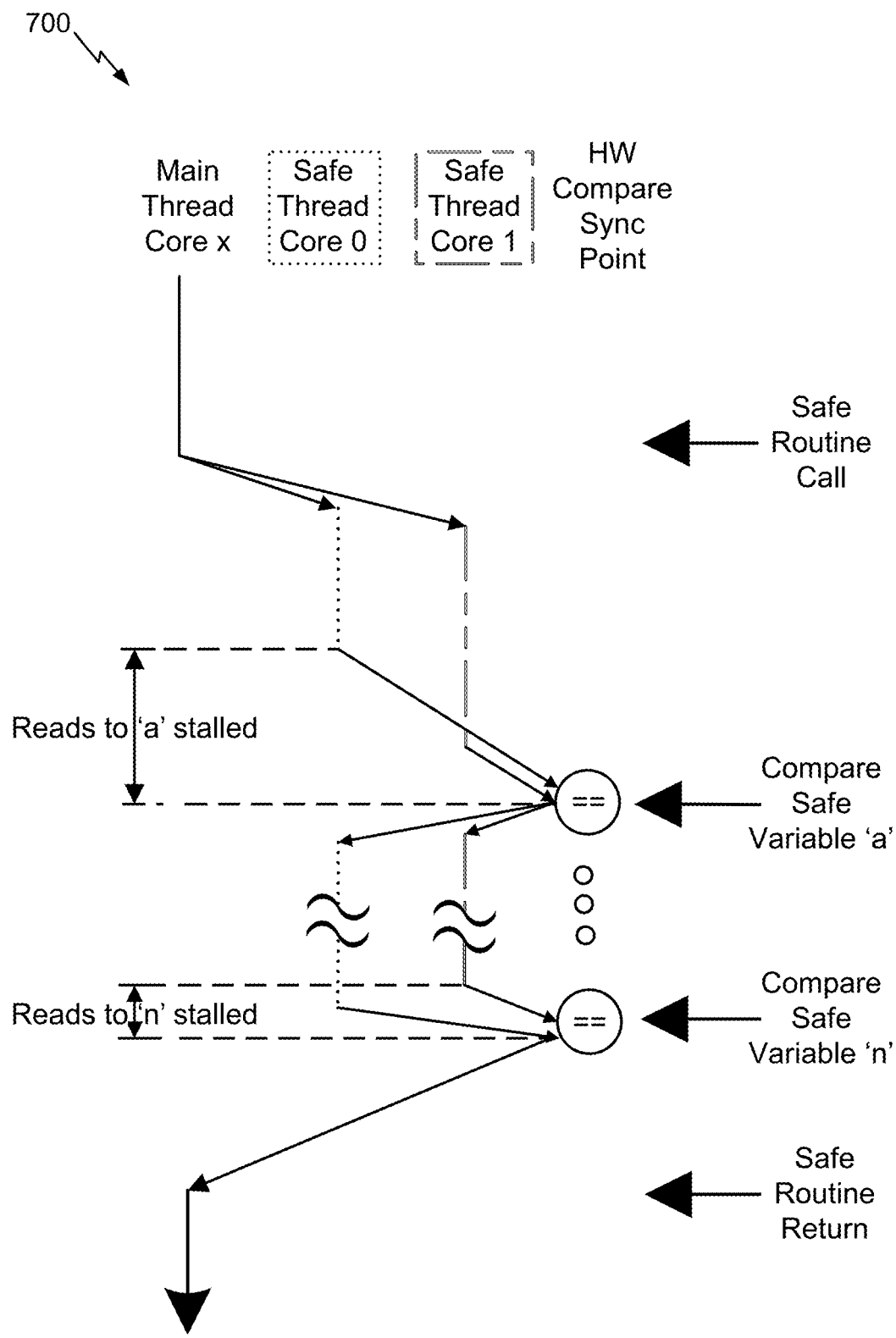
FIG. 7 is a flow diagram illustrating explicit lockstep operation to provide functional safety (FuSa), according to various aspects of the present disclosure.

FIG. 7 is a flow diagram illustrating explicit lockstep operation to provide functional safety (FuSa), according to various aspects of the present disclosure. As shown in FIG. 7, an explicit lockstep operation flow diagram 700 illustrates a main thread core X that is configured to allocate physical pages and comparator hardware, for example, as shown in FIG. 3. In this example, a safe routine call by the main thread core X spawns a safe thread core 0 (e.g., a first safe thread core) and a safe thread core 1 (e.g., a second safe thread core), and the main thread core X waits for the safe thread core 0 and the safe thread core 1 to complete. In various aspects of the present disclosure, the safe thread core 0 and the safe thread core 1 each initialize safe variables and compute the safe variables.

As shown in FIG. 7, one of the safe thread core 0 or the safe thread core 1 is hardware stalled until the other safe thread reaches the same point (e.g., reads to safe variable 'a' are stalled until comparison of the safe variable 'a' is performed at a synchronization point). If the comparison of the safe variable 'a' yields a match, the reads are allowed to proceed. Otherwise, the hardware comparator detects a mismatch, and an error completion is issued, which allows a precise exception to occur. In this explicit lockstep operation, once all safe variables (e.g., 'a'-'n') are computed, the safe routine returns control to the main thread core X. In various aspects of the present disclosure, one of the safe threads (e.g., the safe thread core 0 or the safe thread core 1) may run on a processor core X that runs the main thread core X.

Figure 8:
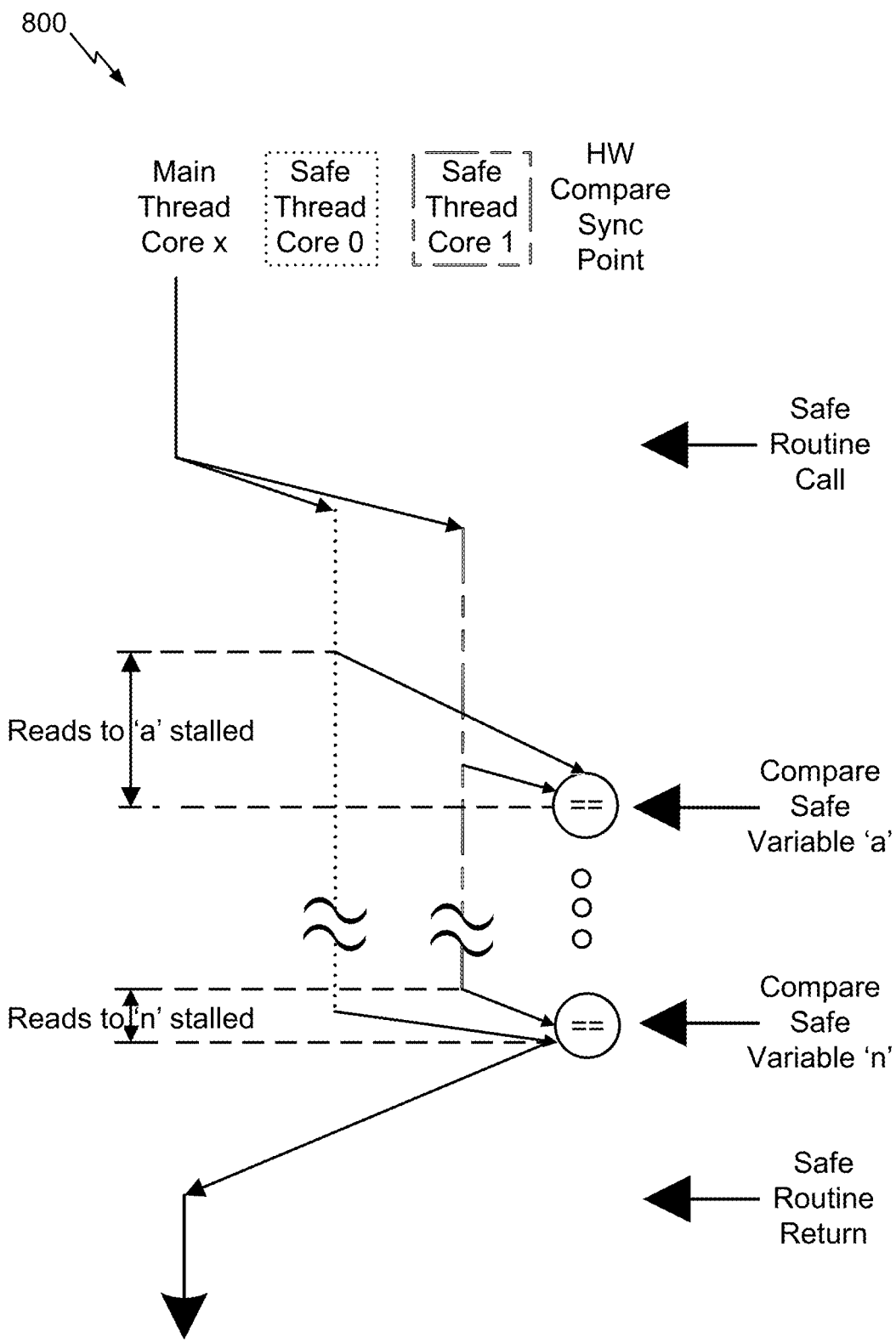
FIG. 8 is a flow diagram illustrating explicit lockstep operation to provide functional safety (FuSa), according to various aspects of the present disclosure.

FIG. 8 is a flow diagram illustrating explicit lockstep operation to provide functional safety (FuSa), according to various aspects of the present disclosure. As shown in FIG. 8, an explicit lockstep operation flow diagram 800 illustrates a non-blocking variation, in which the main thread core X is configured to allocate physical pages and comparator hardware, for example, as shown in FIG. 3. In this example, the safe routine call spawns the safe thread core 0 and the safe thread core 1. In various aspects of the present disclosure, the safe thread core 0 and the safe thread core 1 each initialize safe variables and compute the safe variables.

As shown in FIG. 8, the safe thread core 0 and the safe thread core 1 are not hardware stalled on write operations but do stall on a read unless both threads write identical values. In this example, the safe thread core 0 or the safe thread core 1 may get ahead of the other thread until being blocked at a last safe variable or as a result of reaching a synchronization point. In this explicit lockstep operation, no corrupt data is allowed to pass out of the comparator hardware because any read is blocked until a valid compare occurs. Once all safe variables are computed and a valid compare occurs, the safe routine returns control to the main thread core X, for example, as shown in the process of FIG. 8.

In various aspects of the present disclosure, explicit lockstep operation may be utilized to provide software test library (STL) assistance. For example, STLs may have trouble covering all cases of a context. For example, a gate failure in an adder that impacts higher order bits of a result involves processing through a large set of test vectors for detection. Explicit lockstep operation may help simplify this process. Additionally, during operation, an STL transitions a core offline (e.g., from regular operation). Consequently, one core runs a regular workload with a lockstep core running an equivalent use of resources. In an end user operation variation, explicit lockstep is rotated, and all cores runs a normal workload, in which services are provided to toggle coverage on workloads. For example, exponentials are covered on a workload and core that uses the exponentials. The explicit lockstep operation may aid in defining safe variables that cover the workloads and core that uses the exponentials. Additionally, explicit lockstep operation may improve STL operation by running through large data ranges and reducing test granularity by running on groups of instructions rather than running instructions.

Figure 9:
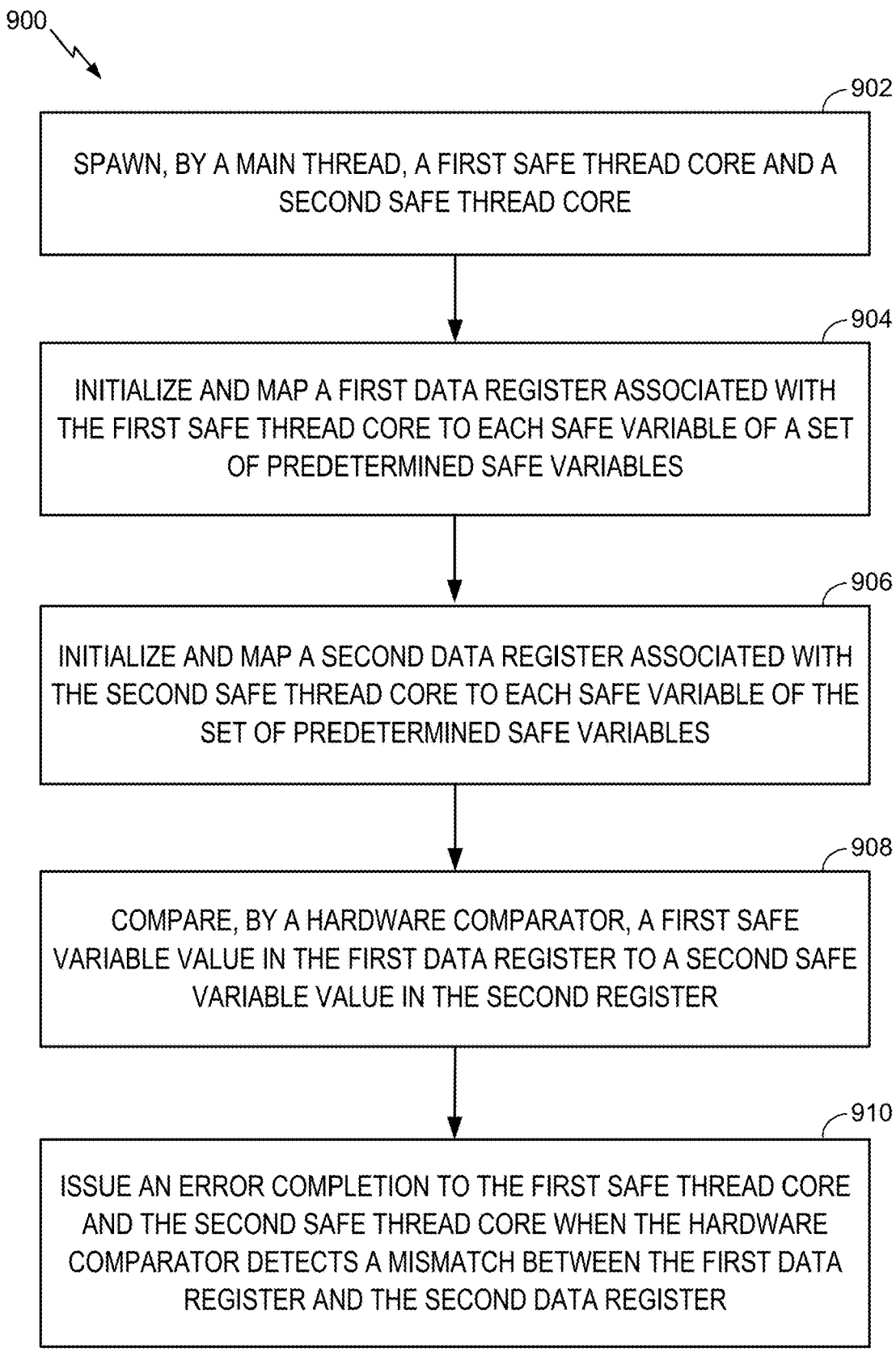
FIG. 9 is a process flow diagram illustrating a method for explicit lockstep operation to provide functional safety (FuSa), according to various aspects of the present disclosure.

FIG. 9 is a process flow diagram illustrating a method 900 for explicit lockstep operation to provide functional safety (FuSa), according to various aspects of the present disclosure. The method 900 begins at block 902 where a first safe thread core and a second safe thread core are spawned by a main thread. For example, as shown in FIGS. 7 and 8, the safe routine call by the main thread core X spawns the safe thread core 0 (e.g., the first safe thread core) and the safe thread core 1 (e.g., the second safe thread core), and the main thread core X waits for the safe thread core 0 and the safe thread core 1 to complete.

At block 904, a first data register associated with the first safe thread core is initialized and mapped to each safe variable of a set of predetermined safe variables. At block 906, a second data register associated with the second safe thread core is initialized and mapped to each safe variable of the set of predetermined safe variables. For example, as shown in FIG. 3, a physical memory page (e.g., by using a request (Req) and a page identification (PID) (Req+PID)) is allocated and mapped to an address space, and the safe variable is mapped to an offset in the allocated, physical memory pages. For example, a first physical memory page and a first address space may be assigned to one of the processor cores, and a second physical memory page and a second address space may be assigned to another of the processor cores.

At block 908, a hardware comparator compares a first safe variable value in the first data register to a second safe variable value in the second register. For example, as shown in FIG. 3, the comparator hardware 300 compares results of the individual safe variables, which are written by two separate ones of the processor cores (core 0, core 1, . . . , core N). Once the second processor core 1 completes the write, the safe variable value in the first data register 312 and the safe variable value in the second data register 314 are compared at the comparator block 310 and if the data is identical, both cores are provided with a completion.

At block 910, an error completion is issued to the first safe thread core and the second safe thread core when the hardware comparator detects a mismatch between the first data register and the second data register. For example, as shown in FIG. 3, once the second processor core 1 completes the write, a safe variable value in the first data register 312 and a safe variable value in the second data register 314 are compared at the comparator block 310 and if the data is identical, both cores are provided with a completion. The data is then written through to memory (or a final destination) using the memory write block 340. In some aspects of the present disclosure, the first data register 312 and the second data register 314 may store a variable that is a memory mapped location. By contrast, if the data does not match, both cores are given an error completion, so a precise interrupt is taken. In this example, the data associated with the safe variable is not written to a next level of the memory 118 (of FIG. 2).

In some aspects, the method 900 may be performed by the SoC 100 (FIG. 1). That is, each of the elements of method 900 may, for example, but without limitation, be performed by the SoC 100 or one or more processors (e.g., CPU 102 and/or NPU 130) and/or other components included therein.

Figure 10:
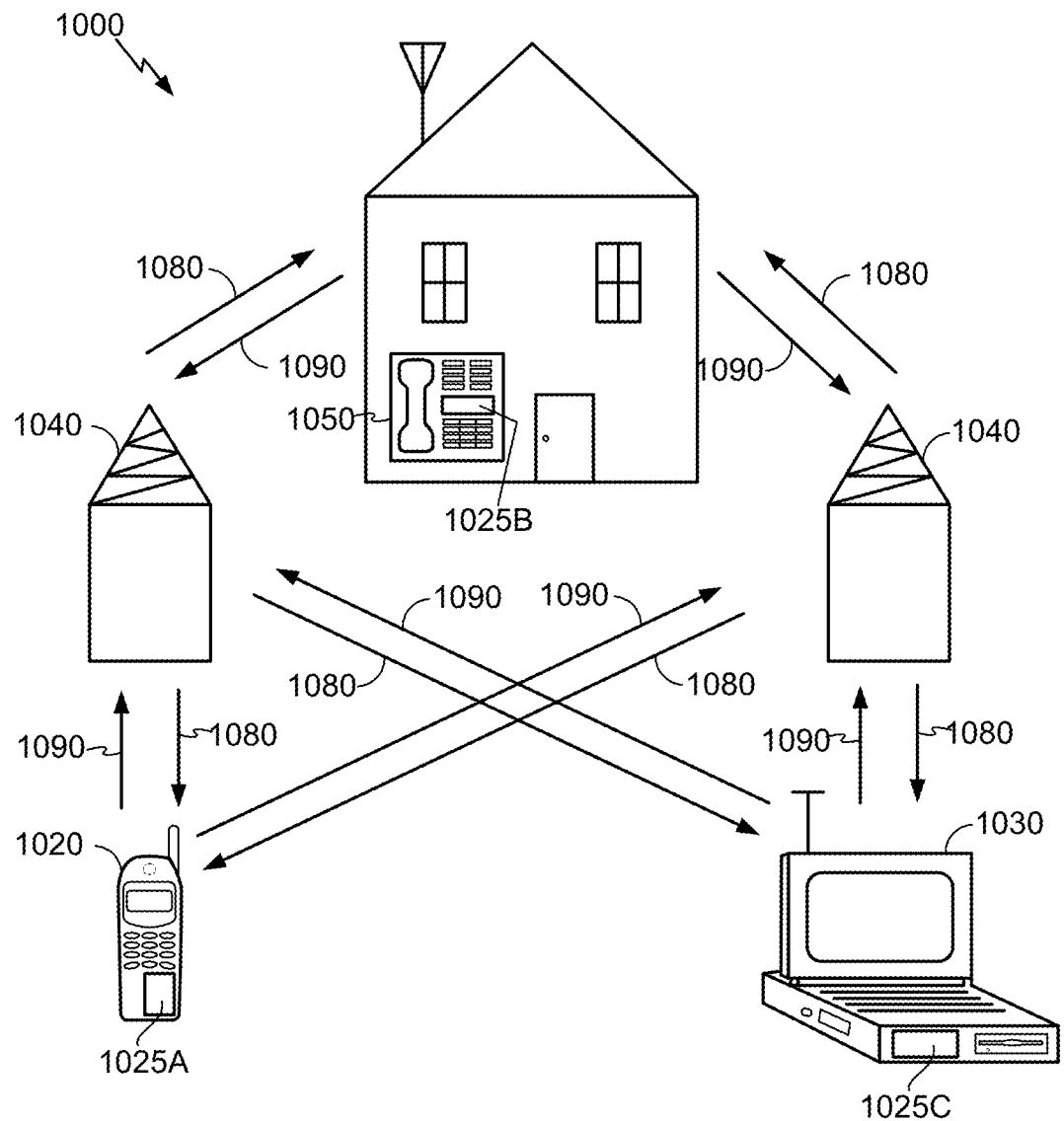
FIG. 10 is a block diagram showing an exemplary wireless communications system in which a configuration of the disclosure may be advantageously employed.

FIG. 10 is a block diagram showing an exemplary wireless communications system 1000 in which an aspect of the disclosure may be advantageously employed. For purposes of illustration, FIG. 10 shows three remote units 1020, 1030, and 1050, and two base stations 1040. It will be recognized that wireless communications systems may have many more remote units and base stations. Remote units 1020, 1030, and 1050 include IC devices 1025A, 1025C, and 1025B that include the disclosed explicit lockstep operation. It will be recognized that other devices may also include the disclosed explicit lockstep operation, such as the base stations, switching devices, and network equipment. FIG. 10 shows forward link signals 1080 from the base stations 1040 to the remote units 1020, 1030, and 1050, and reverse link signals 1090 from the remote units 1020, 1030, and 1050 to base stations 1040.

In FIG. 10, remote unit 1020 is shown as a mobile telephone, remote unit 1030 is shown as a portable computer, and remote unit 1050 is shown as a fixed location remote unit in a wireless local loop system. For example, the remote units may be a mobile phone, a hand-held personal communications systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 10 illustrates remote units according to aspects of the present disclosure, the disclosure is not limited to these exemplary illustrated units. Aspects of the present disclosure may be suitably employed in many devices, which include the disclosed explicit lockstep operation.

Figure 11:
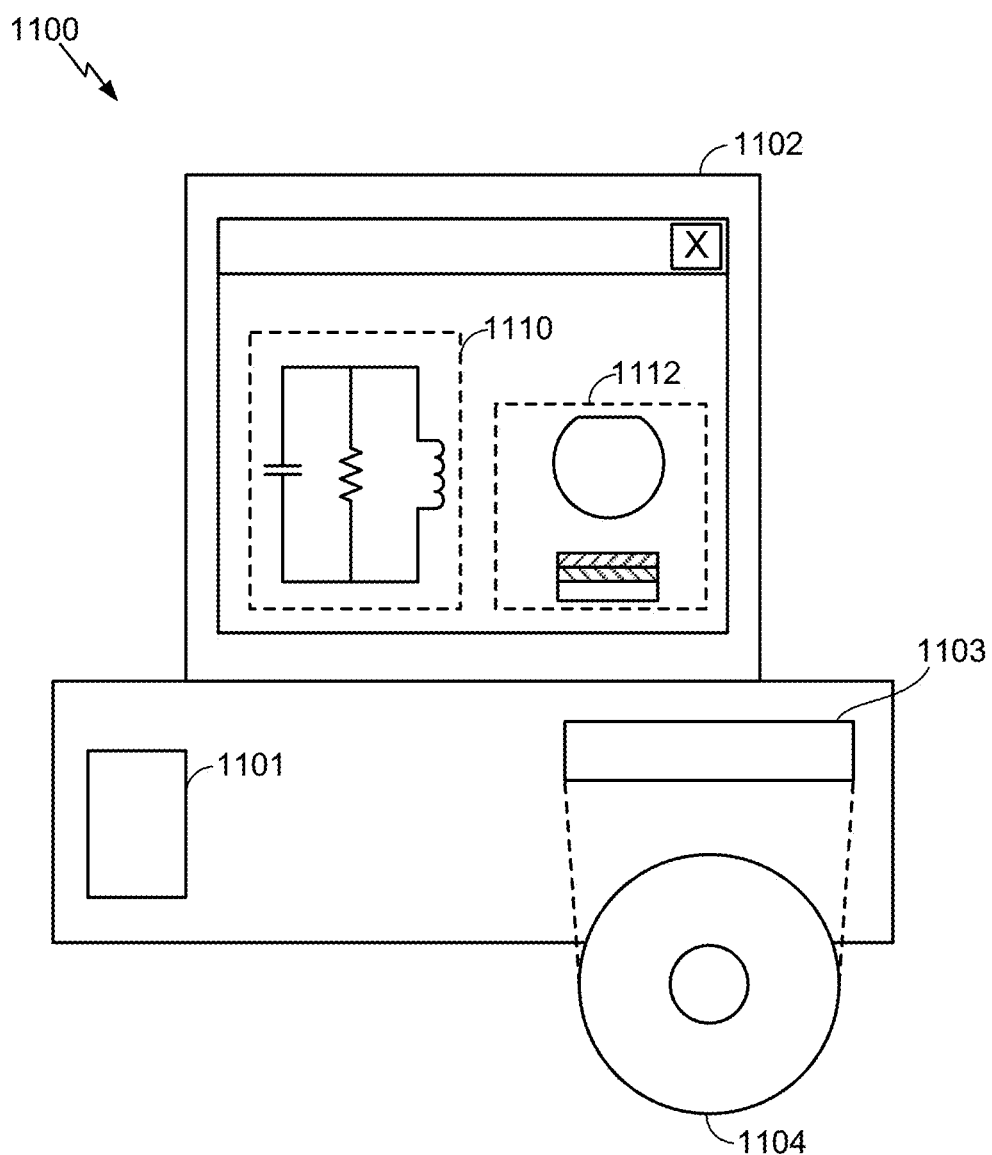
FIG. 11 is a block diagram illustrating a design workstation used for circuit, layout, and logic design of a semiconductor component according to one configuration.

FIG. 11 is a block diagram illustrating a design workstation used for circuit, layout, and logic design of a semiconductor component, such as the comparator of the explicit lockstep operation disclosed above. A design workstation 1100 includes a hard disk 1101 containing operating system software, support files, and design software such as Cadence or OrCAD. The design workstation 1100 also includes a display 1102 to facilitate design of a circuit 1110 or an integrated circuit (IC) component 1112 such as the disclosed the comparator of the explicit lockstep operation. A storage medium 1104 is provided for tangibly storing the design of the circuit 1110 or the IC component 1112 (e.g., the comparator of the explicit lockstep operation). The design of the circuit 1110 or the IC component 1112 may be stored on the storage medium 1104 in a file format such as GDSII or GERBER. The storage medium 1104 may be a CD-ROM, DVD, hard disk, flash memory, or other appropriate device. Furthermore, the design workstation 1100 includes a drive apparatus 1103 for accepting input from or writing output to the storage medium 1104.

Data recorded on the storage medium 1104 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 1104 facilitates the design of the circuit 1110 or the IC component 1112 by decreasing the number of processes for designing semiconductor wafers.

Implementation examples are described in the following numbered clauses:

1. A method of explicit lockstep for functional safety, the method comprising:
   spawning, by a main thread, a first safe thread core and a second safe thread core;
   initializing and mapping a first data register associated with the first safe thread core to each safe variable of a set of predetermined safe variables;
   initializing and mapping a second data register associated with the second safe thread core to each safe variable of the set of predetermined safe variables;
   comparing, by a hardware comparator, a first safe variable value in the first data register to a second safe variable value in the second register; and
   issuing an error completion to the first safe thread core and the second safe thread core when the hardware comparator detects a mismatch between the first data register and the second data register.
2. The method of clause 1, further comprising allowing a read to an address associated with the first safe variable value when the hardware comparator detects a match.
3. The method of any of clauses 2 or 3, further comprising blocking the first safe thread core or the second safe thread core from proceeding until both the first data register and the second data register are written with the first safe variable value.
4. The method of any of clauses 1-3, further comprising stalling a read of the first safe thread core and the second safe thread core until both the first safe thread core and the second safe thread core write identical values to the first data register and the second data register.
5. The method of any of clauses 1-4, further comprising stalling the first safe thread core or the second safe thread core until both the first safe thread core and the second safe thread core are at a synchronization point.
6. The method of any of clauses 1-5, in which one of the first safe thread core or the second safe thread core executes on a processor core of the main thread.
7. The method of any of clauses 1-6, further comprising:
   allocating, by the main thread, a first physical memory page and a first address space mapped to the first data register associated with the first safe thread core; and
   allocating, by the main thread, a second physical memory page and a second address space mapped to the second data register associated with the second safe thread core.
8. The method of any of clauses 1-7, further comprising blocking a read by any of the first safe thread core and the second safe thread core when the hardware comparator detects the mismatch between the first data register and the second data register.
9. The method of any of clauses 1-8, further comprising writing the first safe variable value to memory when a match is detected between the first data register and the second data register.
10. The method of any of clauses 1-9, further comprising issuing a hardware interrupt when the hardware comparator detects the mismatch between the first register and the second register.
11. A non-transitory computer-readable medium having program code recorded thereon for explicit lockstep for functional safety, the program code being executed by a processor and comprising:
   program code to spawn, by a main thread, a first safe thread core and a second safe thread core;
   program code to initialize and map a first data register associated with the first safe thread core to each safe variable of a set of predetermined safe variables;
   program code to initialize and map a second data register associated with the second safe thread core to each safe variable of the set of predetermined safe variables;
   program code to compare, by a hardware comparator, a first safe variable value in the first data register to a second safe variable value in the second register; and
   program code to issue an error completion to the first safe thread core and the second safe thread core when the hardware comparator detects a mismatch between the first data register and the second data register.
12. The non-transitory computer-readable medium of clause 11, further comprising program code to allow a read to an address associated with the first safe variable value when the hardware comparator detects a match.
13. The non-transitory computer-readable medium of any of clauses 11 or 12, further comprising program code to block the first safe thread core or the second safe thread core from proceeding until both the first data register and the second data register are written with the first safe variable value.
14. The non-transitory computer-readable medium of any of clauses 11-13, further comprising program code to stall a read of the first safe thread core and the second safe thread core until both the first safe thread core and the second safe thread core write identical values to the first data register and the second data register.
15. The non-transitory computer-readable medium of any of clauses 11-14, further comprising program code to stall the first safe thread core or the second safe thread core until both the first safe thread core and the second safe thread core are at a synchronization point.
16. The non-transitory computer-readable medium of any of clauses 11-15, in which one of the first safe thread core or the second safe thread core executes on a processor core of the main thread.
17. The non-transitory computer-readable medium of any of clauses 11-16, further comprising:
   program code to allocate, by the main thread, a first physical memory page and a first address space mapped to the first data register associated with the first safe thread core; and
   program code to allocate, by the main thread, a second physical memory page and a second address space mapped to the second data register associated with the second safe thread core.
18. The non-transitory computer-readable medium of any of clauses 11-17, further comprising program code to block a read by any of the first safe thread core and the second safe thread core when the hardware comparator detects the mismatch between the first data register and the second data register.
19. The non-transitory computer-readable medium of any of clauses 11-18, further comprising program code to write the first safe variable value to memory when a match is detected between the first data register and the second data register.
20. The non-transitory computer-readable medium of any of clauses 11-19, further comprising program code to issue a hardware interrupt when the hardware comparator detects the mismatch between the first register and the second register.

For a firmware and/or software implementation, the methodologies may be implemented with modules (e.g., procedures, functions, etc.) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform the same function or achieve the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of explicit lockstep for functional safety, the method comprising:
    spawning, by a main thread, a first safe thread and a second safe thread;
    initializing and mapping a first data register associated with the first safe thread to each safe variable of a set of predetermined safe variables;
    allocating, by the main thread, a first physical memory page and a first address space mapped to the first data register associated with the first safe thread;

initializing and mapping a second data register associated with the second safe thread to each safe variable of the set of predetermined safe variables;

allocating, by the main thread, a second physical memory page and a second address space mapped to the second data register associated with the second safe thread;

comparing, by a hardware comparator, a first safe variable value in the first data register to a second safe variable value in the second register; and issuing an error completion to the first safe thread and the second safe thread when the hardware comparator detects a mismatch between the first data register and the second data register.

2. The method of claim 1, further comprising allowing a read to an address associated with the first safe variable value when the hardware comparator detects a match.

3. The method of claim 1, further comprising blocking the first safe thread or the second safe thread from proceeding until both the first data register and the second data register are written with the first safe variable value.

4. The method of claim 1, further comprising stalling a read of the first safe thread and the second safe thread until both the first safe thread and the second safe thread write identical values to the first data register and the second data register.

5. The method of claim 1, further comprising stalling the first safe thread or the second safe thread until both the first safe thread and the second safe thread are at a synchronization point.

6. The method of claim 1, in which one of the first safe thread or the second safe thread executes on a processor core of the main thread.

7. The method of claim 1, further comprising blocking a read by any of the first safe thread and the second safe thread when the hardware comparator detects the mismatch between the first data register and the second data register.

8. The method of claim 1, further comprising writing the first safe variable value to memory when a match is detected between the first data register and the second data register.

9. The method of claim 1, further comprising issuing a hardware interrupt when the hardware comparator detects the mismatch between the first register and the second register.

10. A non-transitory computer-readable medium having program code recorded thereon for explicit lockstep for functional safety, the program code being executed by a processor and comprising:

program code to spawn, by a main thread, a first safe thread and a second safe thread;

program code to initialize and map a first data register associated with the first safe thread to each safe variable of a set of predetermined safe variables;

program code to allocate, by the main thread, a first physical memory page and a first address space mapped to the first data register associated with the first safe thread;

program code to initialize and map a second data register associated with the second safe thread to each safe variable of the set of predetermined safe variables;

program code to allocate, by the main thread, a second physical memory page and a second address space mapped to the second data register associated with the second safe thread;

program code to compare, by a hardware comparator, a first safe variable value in the first data register to a second safe variable value in the second register; and program code to issue an error completion to the first safe thread and the second safe thread when the hardware comparator detects a mismatch between the first data register and the second data register.

11. The non-transitory computer-readable medium of claim 10, further comprising program code to allow a read to an address associated with the first safe variable value when the hardware comparator detects a match.

12. The non-transitory computer-readable medium of claim 10, further comprising program code to block the first safe thread or the second safe thread from proceeding until both the first data register and the second data register are written with the first safe variable value.

13. The non-transitory computer-readable medium of claim 10, further comprising program code to stall a read of the first safe thread and the second safe thread until both the first safe thread and the second safe thread write identical values to the first data register and the second data register.

14. The non-transitory computer-readable medium of claim 10, further comprising program code to stall the first safe thread or the second safe thread until both the first safe thread and the second safe thread are at a synchronization point.

15. The non-transitory computer-readable medium of claim 10, in which one of the first safe thread or the second safe thread executes on a processor core of the main thread.

16. The non-transitory computer-readable medium of claim 10, further comprising program code to block a read by any of the first safe thread and the second safe thread when the hardware comparator detects the mismatch between the first data register and the second data register.

17. The non-transitory computer-readable medium of claim 10, further comprising program code to write the first safe variable value to memory when a match is detected between the first data register and the second data register.

18. The non-transitory computer-readable medium of claim 10, further comprising program code to issue a hardware interrupt when the hardware comparator detects the mismatch between the first register and the second register.

* * * * *